(12) United States Patent
Matsuda

(10) Patent No.: US 7,222,219 B2
(45) Date of Patent: May 22, 2007

(54) MEMORY CONTROL METHOD AND MEMORY CONTROL APPARATUS FOR PIPELINE PROCESSING

(75) Inventor: Takayuki Matsuda, Kariya (JP)

(73) Assignee: DENSO Corporation, Kariya (JP)

( * ) Notice: Subject to any disclaimer, the term of this patent is extended or adjusted under 35 U.S.C. 154(b) by 410 days.

(21) Appl. No.: 10/862,345

(22) Filed: Jun. 8, 2004

(65) Prior Publication Data

US 2005/0015561 A1    Jan. 20, 2005

(30) Foreign Application Priority Data

Jul. 15, 2003    (JP) .............................. 2003-274831

(51) Int. Cl.
*G06F 12/00* (2006.01)
(52) U.S. Cl. ........................ 711/137; 711/204; 711/213
(58) Field of Classification Search ................ 711/137, 711/204, 213
See application file for complete search history.

(56) References Cited

U.S. PATENT DOCUMENTS 5,835,754 A * 11/1998 Nakanishi ................... 712/239
6,249,858 B1 * 6/2001 Hayakawa et al. ........... 712/34
6,523,110 B1 * 2/2003 Bright et al. ................ 712/239

OTHER PUBLICATIONS

David A. Patterson and John L. Hennessey; "Computer Organization & Design"; 2nd Edition; 1999; pp. 430-433.

* cited by examiner

Primary Examiner—Reba I. Elmore
(74) Attorney, Agent, or Firm—Posz Law Group, PLC

(57) ABSTRACT

A signal generator detects a stage in which a central processing unit (CPU) reads an interrupt vector number from an instruction controller based on an address on an address bus and generates an address of a ROM to which the CPU makes access subsequently. The generated address is defined as a pre-reading address and this pre-reading address is supplied to the ROM via a selector before the CPU starts accessing to the ROM. In this case, an output buffer is turned off. Thereafter, when the CPU starts accessing to the ROM, the selector is switched and the output buffer is simultaneously turned on so that the address on the address bus is supplied to the ROM.

13 Claims, 6 Drawing Sheets

MEMORY CONTROL METHOD AND MEMORY CONTROL APPARATUS FOR PIPELINE PROCESSING

CROSS REFERENCE TO RELATED APPLICATION

This application is based on and incorporates herein by reference Japanese Patent Application No. 2003-274831 filed on Jul. 15, 2003.

FIELD OF THE INVENTION

The present invention relates to a memory control method and a memory control apparatus for realizing high speed access to a memory by a central processing unit (CPU).

BACKGROUND OF THE INVENTION

A central processing unit (CPU) which performs a pipeline processing method is known (for example, COMPUTER ORGANIZATION & DESIGN, 1999, pp 430 to 433, by David A. Patterson; John L. Hennessy). In this CPU, the processing function of reading instructions from a memory and executing the same is divided into a plurality of kinds of stages. Operations of different stages are executed in parallel thereby to partially execute a plurality of instruction processing cycles in the overlapped timings.

FIG. 5A is a schematic illustration of a computer system 101 which is formed with a CPU 102, which is connected to a ROM 104, a RAM (not illustrated), and other peripheral devices via an address bus 106 and a data bus 107.

Here, the CPU 102 will be explained as an example of a CPU which can execute ordinary pipeline processes of five stages. In this CPU 102, a process function is divided into five stages of IF (instruction fetching operation: fetch operation), DEC (instruction decoding), EXE (instruction executing), MA (memory accessing), and WB (writing back) and the pipeline process is executed in such a parallel relationship as illustrated in FIG. 5B.

Namely, in the IF stage, an instruction is read from a memory (mainly, ROM) in which programs are stored in advance, while in the DEC stage, the instructions fetched in the IF stage are decoded. In the EXE stage, arithmetic operations among registers are executed based on the contents decoded in the DEC stage. Moreover, in the MA stage, access (read or write operation) is executed based on the contents decoded in the DEC stage to the memories of ROM and RAM or the like using the results of the arithmetic operations in the EXE stage as the address. In the WB stage, data is written into registers based on the contents decoded in the DEC stage.

High speed instruction processes are realized by performing, in parallel, operations of different stages of a plurality of instruction process cycles. Specifically, when the n-th instruction is read from the memory in the IF stage of the n-th instruction process cycle and the n-th instruction is decoded in the DEC stage of the n-th instruction process cycle, the (n+1)-th instruction is read from the memory of the IF stage of the (n+1)-th instruction process cycle. Moreover, when the arithmetic operation is executed based on the n-th instruction in the EXE stage of the n-th instruction process cycle, the (n+1)-th instruction is decoded in the DEC stage of the (n+1)-th instruction process cycle and the (n+2)-th instruction is read from the memory of the IF stage of the (n+2)-th instruction process cycle.

In addition, all stage operations are executed synchronously with the system clock of the CPU (operation clock of the CPU) and one stage operation is basically completed within one period T of the system clock.

Meanwhile, in the CPU 102, the length of IF stage (namely, execution period of the IF stage) is determined depending on a response speed of a memory (ROM 104) in which programs are stored. Namely, in order to accurately read instructions from the memory, the execution time T of the IF stage must be set equal to or longer than the time required until the data on the data bus is established from change of the address on the address bus (the time required for memory access).

In addition, the time required for operations of each stage must be set equally in the pipeline process for parallel execution of all stages, and this operation time is determined in accordance with the stage which requires the longest process time. Accordingly, the CPU 102 has a problem that the processing speed of the CPU 102 (i.e. execution interval in the EXE stage) exceeding the processing speed of the ROM 104 cannot be attained. Namely, even when the processing speed of the CPU 102 is higher than the response speed of the ROM 104, the processing speed of the system which is configured with inclusion of the ROM 104 cannot exceed the response speed of the ROM 104.

On the other hand, as in the case of a computer system 101a illustrated in FIG. 6A, a high speed process may be assumed by realizing processing speed of a CPU 102a which is higher than the response speed of the ROM 104 by providing a wait control circuit 105 to adjust difference in the processing speeds of the CPU 102a and the ROM 104.

Namely, the wait control circuit 105 monitors control signals for the address bus 106 and the read and write operations not illustrated and makes the wait signal W active by as long as the predetermined number of clock cycles, upon detection of access to the ROM 104. The CPU 102a does not perform the update of stage only for the period in which the wait signal W is in the active state.

When an operation of reading the instruction from the ROM 104 in the IF stage is continuously executed, realization of high speed operation with the method described above is worthless, because the wait signal W is generated in every stage. However, in fact, a high speed operation realized with the method described above is useful when a branching instruction is executed or when an interrupt process routine is activated in accordance with the request for interrupt because the reading of instruction from the ROM 104 is interrupted for a certain period.

A practical example of such high speed operation will be described below.

FIG. 6B is a timing diagram illustrating the operations to execute the branching process in the n-th instruction process cycle. The stage execution time of the CPU 102a is expressed by (1/2)×T, the response time of the ROM 104 by T, and the time wherein the wait signal W is in the active state by (1/2)×T.

As illustrated in FIG. 6B, when the n-th instruction is read from the ROM 104 in the IF stage of the n-th instruction process cycle, since access to the ROM 104 is detected with the wait control circuit 105, the wait signal W becomes active during the period of (1/2)×T and the CPU 102a executes the IF stage for the period of T. Namely, since the response time of the ROM 104 becomes equal to the execution time in the IF stage, the CPU 102a can read the instructions from the ROM 104 without fail.

Next, the CPU 102a detects, in the DEC stage of the n-th instruction process cycle, that the instruction read from the ROM 104 is a branching instruction. Therefore, the CPU 102a then executes the pipeline control to stop execution of the IF stages of all instruction process cycles (at the (n+1)-th and (n+2)-th positions) which are located before the IF stage of the instruction process cycle to process the instruction of the branching destination (at the (n+3)-th position). However, since the IF stage of the (n+1)-th instruction process cycle is already executed, the pipeline control is performed to stop only the execution of the IF stage of the (n+2)-th instruction process cycle. Here, since the wait process is executed in the same manner as the IF stage of the n-th instruction process cycle in the IF stage of the (n+1)-th instruction process cycle, the (n+1)-th instruction is accurately read from the ROM 104 but this instruction is cancelled because this is not the instruction to be executed.

In the EXE stage of the subsequent n-th instruction process cycle, arithmetic operation of address is executed to obtain an address of the branching destination. In this timing, the DEC stage of the (n+1)-th instruction process cycle and the IF stage of the (n+2)-th instruction process cycle are not executed. Consequently, since access to the ROM 103 is not executed, the wait process is not executed and the process is executed within the ordinary stage process time (1/2)×T.

In the MA stage of the subsequent n-th instruction process cycle, since a value of a program counter which indicates the instruction reading address is updated to a value of the address of the branching destination calculated in the EXE stage, the instruction for branching to a destination is read from the ROM 104 in the IF stage of the (n+3)-th instruction process cycle. Here, the wait process is executed as in the case of the IF stage of the n-th instruction process cycle in the IF stage of the (n+3)-th instruction process cycle. Accordingly, the (n+3)-th instruction is read accurately from the ROM 104. Namely, the processing speed can be improved as much as the period of (1/2)×T in comparison with that of FIG. 5B in which the period up to completion of reading operation of the (n+3)-th instruction from the start of the reading operation of the n-th instruction is set to the period T in every stage.

FIG. 7 is a timing diagram illustrating operations to accept an interrupt request in the DEC stage of the n-th instruction process cycle. However, the ROM 104 is assumed herein to store an interrupt process routine programmed for every interrupt factor and an interrupt address table which is an aggregation of the head addresses of such interrupt process routines, and to search the interrupt address table in accordance with interrupt vector numbers read from an interrupt controller (not illustrated). Moreover, the interrupt vector number indicates an offset amount from the head address of the interrupt address table and is assigned in advance for each interrupt factor. That is, the head address of the interrupt process routine corresponding to the interrupt request generated can be acquired by adding the interrupt vector number to the head address value of the interrupt address table.

As illustrated in FIG. 7, when the interrupt request is accepted in the DEC stage of the n-th instruction process cycle, the instruction read in the IF stage of the n-th instruction process cycle is cancelled and the process related to the activation of the interrupt process routine is executed in the DEC and subsequent stages of the n-th instruction process cycle.

First, in the DEC stage of the n-th instruction process cycle, address information required to read the interrupt vector number from the interrupt controller (not illustrated) is prepared in substitution for the data prepared in accordance with the instruction read in the IF stage of the n-th instruction process cycle. Here, the IF stage of the (n+1)-th instruction process cycle is inherently unnecessary stage. However, since this IF stage is already processed when the interrupt request is accepted, the instruction is read from the ROM 104 but this instruction is cancelled without execution. In this case, the wait signal W is activated with the wait control circuit 105 and processed for the period of T. Subsequently, since the IF stages of the (n+2)-th to (n+6)-th instruction process cycles are not yet processed when the interrupt request is accepted, the instruction reading operations from the ROM 104 are never executed through operation control.

Next, in the EXE stage of the n-th instruction process cycle, the arithmetic operations are executed, when required, based on the address information prepared in the DEC stage of the n-th instruction process cycle to generate an address to read the instruction vector number from the interrupt controller (not illustrated).

Next, in the MA stage of the n-th instruction process cycle, the interrupt vector number is read, via the data bus 7, from the interrupt controller (not illustrated) in accordance with the address generated in the EXE stage of the n-th instruction process cycle. This interrupt vector number is then transferred to the DEC stage of the (n+2)-th instruction process cycle. Simultaneously, in the DEC stage of the (n+2)-th instruction process cycle, head address information of the interrupt address table is prepared.

Next, in the EXE stage of the (n+2)-th instruction process cycle, arithmetic operations of address for referring to the interrupt address table are executed based on the interrupt vector number transferred from the MA stage of the n-th instruction process cycle and the head address information of the predetermined interrupt address table.

Next, in the MA stage of the (n+2)-th instruction process cycle, data, namely the interrupt process routine start address corresponding to the interrupt request generated is read from the ROM 104 depending on the address calculated in the EXE stage of the (n+2)-th instruction process cycle and this start address is transferred to the DEC stage of the (n+4)-th instruction process cycle. Since the data is read from the ROM 104 in the MA stage of the (n+2)-th instruction process cycle, the wait signal w is activated with the wait control circuit 105 and is then processed for the period of T.

Next, in the EXE stage of the (n+4)-th instruction process cycle, the data transferred from the MA stage of the (n+2)-th instruction process cycle, namely the interrupt process routine start address corresponding to the interrupt request generated is transferred to the MA stage of the (n+4)-th instruction process cycle.

As the next step, in the MA stage of the (n+4)-th instruction process cycle, the data transferred from the EXE stage of the (n+4)-th instruction process cycle, namely the interrupt process routine start address corresponding to the interrupt request generated is set to a program counter and the top instruction of the interrupt process routine is read by the ROM 104 to start the IF stage of the (n+7)-th interrupt process cycle to execute the interrupt process routine corresponding to the interrupt requests generated in the subsequent stages.

Since the reading operation from the ROM 104 is executed in the IF stage of the (n+7)-th instruction process cycle, the wait signal W is activated with the wait control circuit 105 and is then processed for the period of T. That is, in comparison with the case wherein all stages are processed within the period of T, the time required until the reading operation of the (n+7)-th instruction is completed from the start of the reading operation of the n-th instruction can be reduced by as much as the period of 2×T(=(1/2)×T×4).

Advantages of the present invention described above are very distinctive in a microcomputer for controlling a built-in apparatus to execute the programs (namely, the programs including many branching instructions), which result in a large speed difference between the CPU and ROM, comprises many peripheral circuits to frequently generate the interrupt requests and also changes the processes in accordance with the situations or the like. However, the request for further high speed operations is still further increasing.

SUMMARY OF THE INVENTION

Therefore, an object of the present invention is to provide a memory control method and a memory control apparatus for further improving a processing speed of a central processing unit (CPU) by saving waiting time in accessing a memory.

In the memory control of the present invention, an address as a next memory access by a central processing unit is identified based on at least any one of data, an address and a control signal transmitted via a data bus, an address bus and a control line connected to the central processing unit. The identified address is defined as a pre-reading address and this pre-reading address is supplied to a memory as an alternative address supplied via the address bus until at least the central processing unit starts accessing the memory.

Accordingly, the central processing unit can reduce the access time of the memory and thereby improve the processing speed by as much as the supply of the pre-reading address before the start of accessing memory. However, supply of the pre-reading address can be executed only during the period wherein the central processing unit does not make access to the object memory.

Moreover, when the pre-reading address is supplied to the memory, the data is read to the data bus from the memory before the central processing unit starts accessing the memory. This may destroy the data on the data bus. Accordingly, the memory should preferably be disconnected from the data bus during the period until the central processing unit starts accessing the memory after the start of supply of the pre-reading address.

As a method of identifying a pre-reading address, data is fetched from a data bus, for example, when the address on the address bus matches with the preset comparison value and the pre-reading address can be identified based on the fetched data, or data is fetched from the data bus when a data fetch instruction is received from the central processing unit and the pre-reading address can be identified based on the fetched data.

In these cases, location identifying information required to identify the address in the memory to which the data to be fetched by the central processing unit is stored is considered as the fetched data. In the former case where matching with the comparison value is defined as the fetch timing of the fetched data, the address with which the central processing unit makes access to fetch the location identifying information is defined as the comparison value. Moreover, in the latter case where the data fetch instruction is defined as the fetch timing of the fetched data, a state signal outputted from the central processing unit when this unit fetches the location identifying information is defined as the data fetch instruction.

When at least an interrupt address table formed by arranging the head address of the interrupt process routine is stored in the memory, the method described above can be adapted by defining, as the location identifying information, offset information indicating the location within the interrupt address table to which the head address of the interrupt process routine to be activated by the central processing unit is stored.

In this case, the access time for fetching the head address of the interrupt process routine to be activated from the interrupt address table can be saved and the time required to activate the interrupt process routine from the acceptance of the interrupt request can also be reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The preferred embodiments of the present invention will be described with reference to the accompanying drawings.

[First Embodiment]

Figure 1:
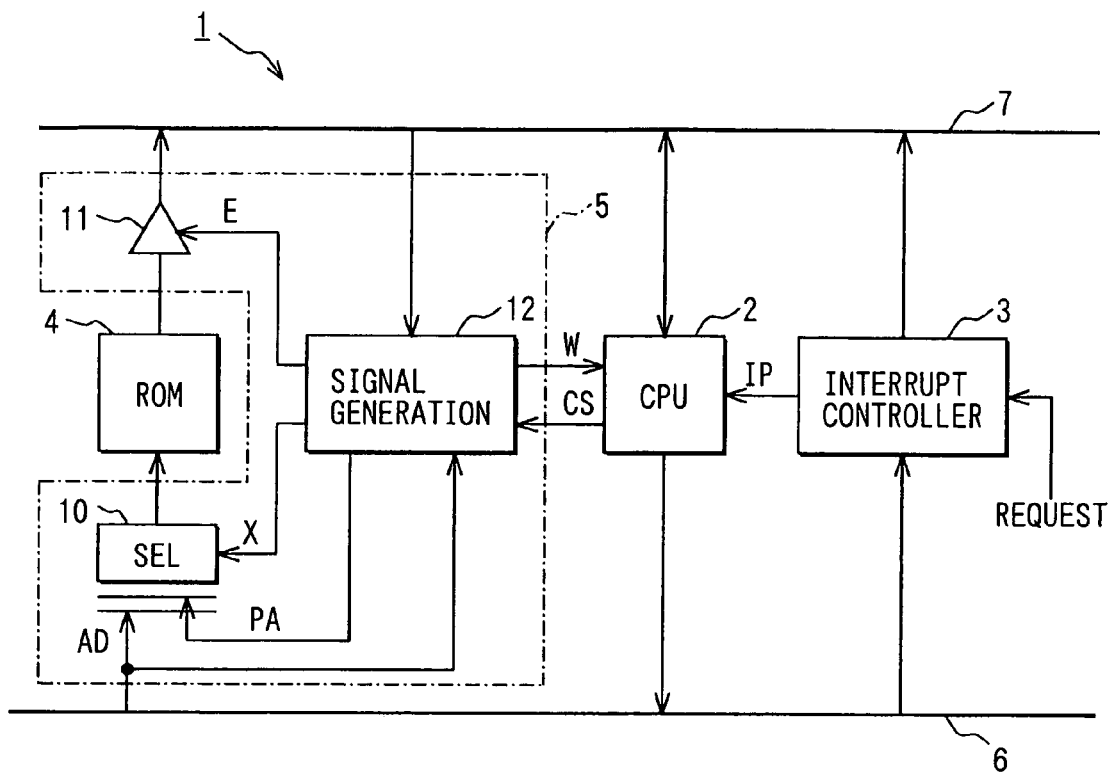
FIG. 1 is a schematic diagram of a computer system including a memory control apparatus according to a first embodiment of the present invention.

As illustrated in FIG. 1, a computer system 1 of the first embodiment comprises a central processing unit (CPU) 2 to execute pipeline process of five stages, an interrupt controller 3 for outputting an interrupt signal IP to the CPU 2 in response to an interrupt request from peripheral apparatuses (not illustrated) and sets also an interrupt vector number corresponding to the interrupt request to internal registers, a ROM 4 storing at least various programs to be executed by the CPU 2, interrupt process routines and an interrupt address table formed by arranging the head addresses of the interrupt process routines, and a memory control apparatus 5 to generate a wait signal W for: the CPU 2 and control access to the ROM 4 in accordance with an access request signal from the CPU 2 (for example, a chip select signal to the ROM 4). These CPU 2, interrupt controller 3, and memory control apparatus 5 are mutually connected via an address bus 6 and a data bus 7. Moreover, the ROM 4 is connected to the address bus 6 and data bus 7 via the memory control apparatus 5.

Among these elements, the CPU 2 is configured, like the prior art CPU, to execute, in parallel with the pipeline process of five stages, an instruction process cycle which is formed of the five stages of the IF stage, DEC stage, EXE stage, MA stage, and WB stage, each of which can execute each instruction to be executed in one cycle of the operation clock.

Moreover, the CPU 2 extends the period to execute the ongoing stage without shifting to the next stage when the wait signal W supplied from the memory control apparatus 5 is in the active state. Moreover, an access request signal CS is generated when instructions and data are read from the ROM 4 in the IF stage and MA stage.

Moreover, the CPU 2 is also constructed to read, when the interrupt signal IP is inputted from the interrupt controller 3, the interrupt vector number from internal registers of the interrupt controller 3 and execute the interrupt routine activation process to obtain the head address of the interrupt process routine to be activated from the interrupt address table of the ROM 4 based on such interrupt vector number.

Here, the interrupt vector number indicates an offset amount from the head address of the interrupt address table and is assigned in advance to each interrupt factor. Namely, the address in which the head address of the interrupt process routine corresponding to the interrupt request generated can be obtained by adding the interrupt vector number to the head address value of the interrupt address table.

Next, the memory control apparatus 5 is provided with a selector 10 as a selecting means to select any one of the address AD or the pre-reading address PA to be described later supplied via the address bus 6 depending on an address selection signal X and then supply this selected address to the ROM 4, an output buffer 11 as a bus separating means to output the data read from the ROM 4 to the data bus 7 when an output acknowledgment signal E is in the active state, and a signal generator 12 for generating the output acknowledgment signal E to the wait signal W to the CPU 2, the address selection signal X to the selector 10 and the output acknowledgment signal E to the output buffer 11 based on the access request signal CS from the CPU 2 and address and data supplied via the address bus 6 and data bus 7.

Figure 2:
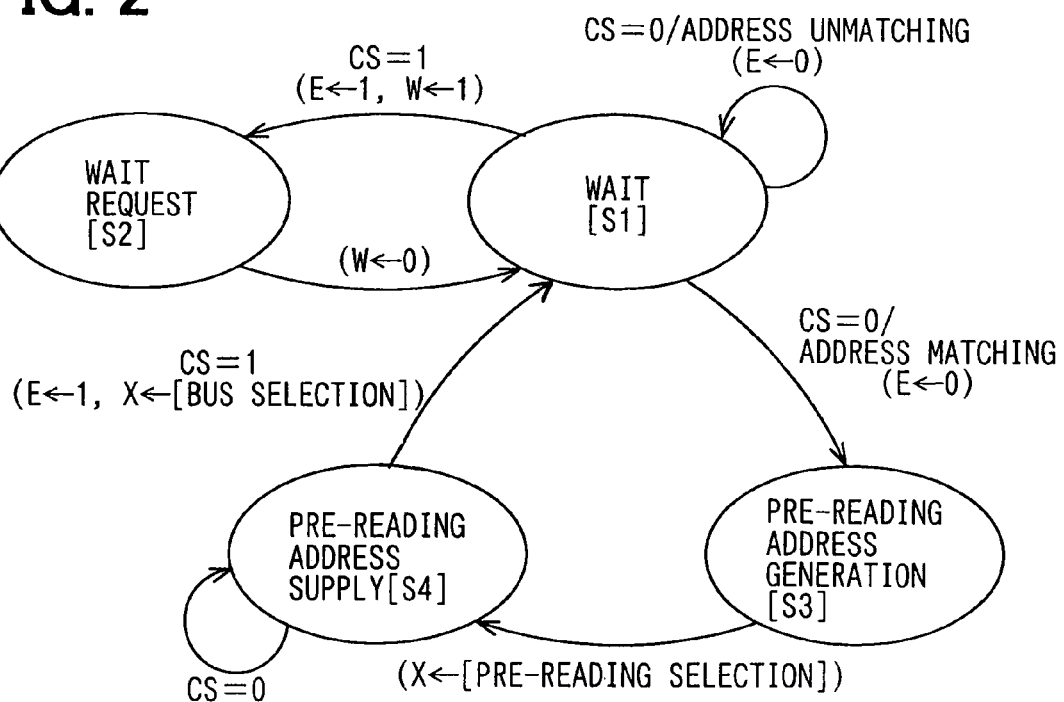
FIG. 2 is a state transition diagram illustrating operations of a signal generator which constitutes the memory control apparatus.

Of these elements forming the memory control apparatus 5, the signal generator 12 comprises an address monitor unit which defines an address to be accessed when the interrupt vector number is read from the internal registers of the interrupt controller 3 as a comparison value and compares this comparison value with the address on the address bus 6, a pre-reading address generator as an address generating means which generates a pre-reading address by fetching the data, namely the interrupt vector number on the data bus 7 and then adding the fetched interrupt vector number to the head address of the preset interrupt address table, and a timing controller as a selection control means which operates in accordance with the state transition diagram illustrated in FIG. 2 to control the output timing of the wait signal W, the address selection signal X and the output acknowledgment signal E.

As illustrated in FIG. 2, the internal state of the timing controller includes four states of "wait S1", "wait request S2", "pre-reading address generation S3", and "pre-reading address supply S4". This internal state shows the following state transition in synchronization with the operation clock of the CPU 2.

First, when the signal generator 12 is activated, the "wait S1" appears. In this timing, the address selection signal X is set so that the selector 10 selects an address AD on the address bus 6 (X←[bus selection]). The output acknowledgment signal E is set to the active state (E←1), while the wait signal W is set to the non-active state (W←0).

In the case of the "wait S1" state, this state shifts to the "wait request S2" by setting the wait signal W to the active state (W←1), and then setting the output acknowledgment signal E to the active state (E←1) if it is in the non-active state (E=0), namely outputting the data read from the ROM 4 to the data bus 7 when the access request is issued from the CPU 2 (CS=1).

In this "wait request S2" state, when the period of one clock passes, the wait signal W is set to the non-active state (W←0) and the state shifts to the "wait S1" state.

In the "wait S1" state, if the access request is not issued from the CPU 2 (CS=0), this state is set to the non-active state (E←0) when the output acknowledgment signal E is in the active state (E=1) and the state shifts in accordance with the result of monitor by the address monitor. Namely, when the address AD on the address bus 6 does not match with the comparison value, the "wait S1" state is maintained, while the state shifts to the "pre-reading address generation S3", when these address and comparison value matches.

In the "pre-reading address generation S3" state, the pre-reading address is generated with operation of the pre-reading address generator. In addition, when the period of one clock passes, the address selection signal X is set so that the selector 10 selects the pre-reading address PA (X←[pre-reading selection]), and this state shifts to the "pre-reading address supply S4". Accordingly, supply of the pre-reading address to the ROM 4 is started.

In the "pre-reading address supply S4" state, while the access request is not issued from the CPU 2 (CS=0), the "pre-reading address supply S4" is maintained. When the access request is issued from the CPU 2 (CS=1), the address selection signal X is set to select the address AD of the address bus 6 and then supply this address to the ROM 4. Simultaneously, the output acknowledgment signal E is set to the active state so that the data read from the ROM 4 is outputted to the data bus 7. Thereafter, the "pre-reading address supply S4" state shifts to the "wait S1" state.

The memory control apparatus 5 constructed as described above issues the wait request during the period of one clock to the CPU 2 (W←1) when the access request is issued from the CPU 2 (CS=1). With this, the access time to the ROM is ensured and the ROM 4 is connected to the data bus 7 (E←1) to enable the CPU 2 to surely read the data from the ROM 4. Namely, when instructions are read continuously from the ROM 4, the internal state of the memory control apparatus 5 alternately repeats the "wait request S2" state and "wait S1" state as illustrated as times t1 to t5 in FIG. 3.

On the other hand, when the access request is not issued from the CPU 2 (CS=0), the state is maintained as the "wait S1" (time t5), the ROM 4 is disconnected from the data bus 7 (E←0) and the address bus 6 is monitored. When the address on the address bus 6 matches the comparison value, namely when the CPU 2 is trying to activate the interrupt process routine by reading the interrupt vector number VN from the interrupt controller 3, the state shifts to the "pre-reading address generation S3" state (time t6), and the interrupt vector number outputted to the data bus 7 is fetched to generate the pre-reading address. Subsequently, the state shifts to the "pre-reading address supply S4" state (time t7) and the pre-reading address is supplied to the ROM 4 before the CPU 2 starts access to the ROM to obtain the head address of the interrupt process routine to be activated by CPU 2(X←[pre-reading selection]). Thereafter, when the access request is issued from the CPU 2 (CS=1), the state shifts to the "wait S1" (time t8) and the address to be supplied to the ROM 4 is switched to the address AD on the address bus 6 from the pre-reading address PA (X←[selection of bus]). Simultaneously, the ROM 4 is connected to the data bus 7 (E←1) so that the CPU 2 can read the data with one clock without execution of the wait process.

Next, operations of the CPU 2 to activate the interrupt process routine will be described with reference to the timing diagram of FIG. 3. However, the stage execution time of the CPU 2 (period of one clock) is defined as T and the response time of the ROM 4, as 2×T.

Figure 3:
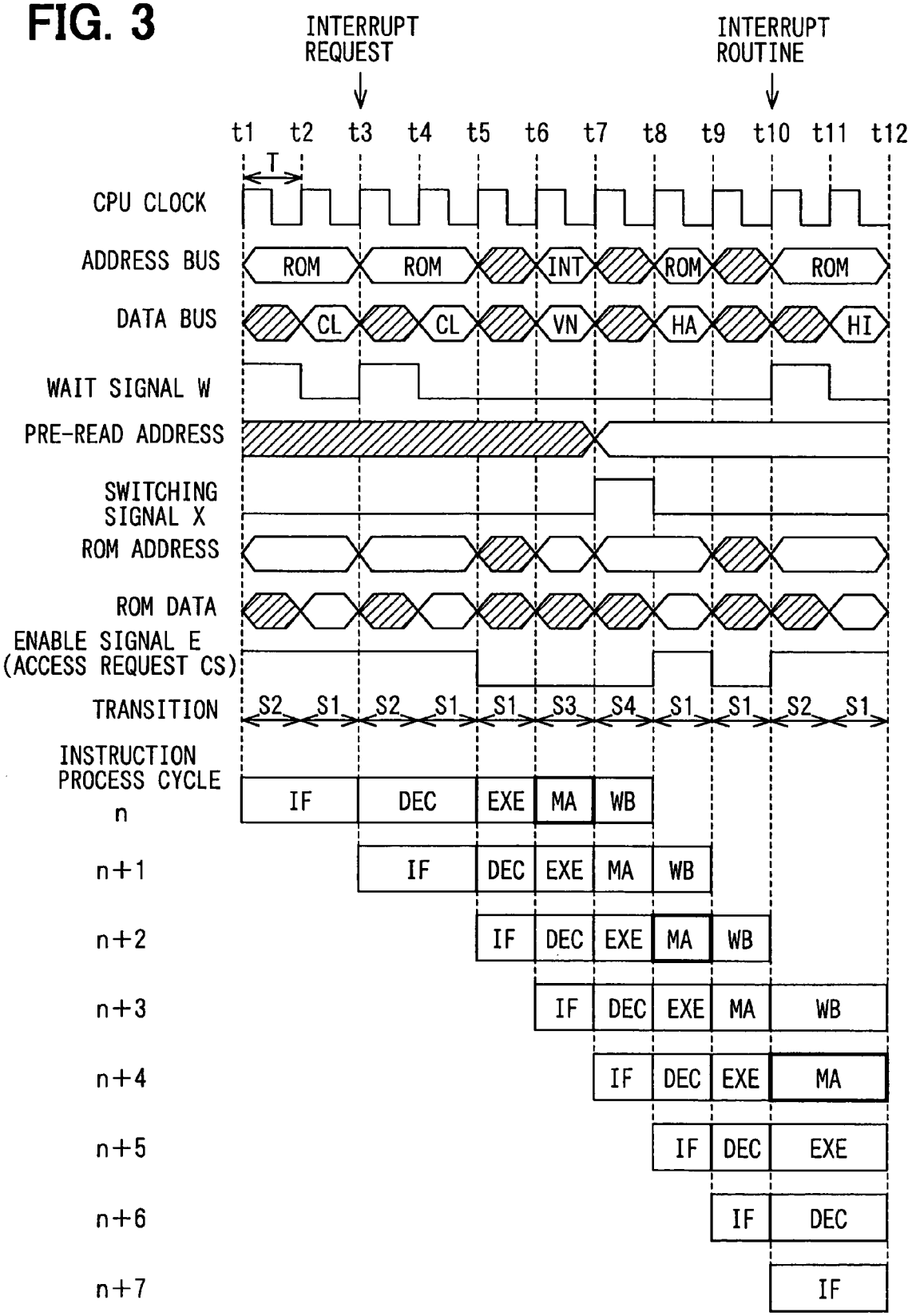
FIG. 3 is a timing diagram illustrating operations of each division and CPU when an interrupt process routine is activated.

As illustrated in FIG. 3, when the interrupt request is accepted in the DEC stage of the n-th instruction process cycle (time t3), the instruction read in the IF stage of the n-th instruction process cycle is cancelled (CL) and the interrupt process routine is activated in the DEC stage and subsequent stages thereof of the n-th instruction process cycle.

First, in the DEC stage of the n-th instruction process cycle, the address information which is required to read the instruction vector number from the instruction controller 3 is substituted for the data which is prepared in accordance with the instruction read in the IF stage of the n-th instruction process cycle. Here, the IF stage of the (n+1)-th instruction process cycle is unnecessary. However, since the IF stage is already processed when the interrupt request is accepted, the instruction from the ROM 4 can be read and this instruction obtained is cancelled without execution thereof. In this case, the access request signal CS for the memory control apparatus 5 is also set to the active state and the wait signal W from the memory control apparatus 5 is also set to the active state. Accordingly, this stage is processed for the period of 2×T.

However, since the IF stages of the subsequent (n+2)-th to (n+6)-th instruction process cycles are not yet processed when the interrupt request is accepted, the reading operation of instructions from the ROM 4 is not executed through the control.

Next, in the EXE stage of the n-th instruction process cycle (time t5), the address to read the interrupt vector number VN from the interrupt controller 3 is generated by executing arithmetic operation, if necessary, based on the address information prepared in the DEC stage of the n-th instruction process cycle.

Next, in the MA stage of the n-th instruction process cycle (time t6), the interrupt vector number is read from the instruction controller 3 via the data bus 7 in accordance with the address generated in the EXE stage of the n-th instruction process cycle. This interrupt vector number is transferred to the DEC stage of the (n+2)-th instruction process cycle. Simultaneously, in the DEC stage of the (n+2)-th instruction process cycle, the head address information of the interrupt address table is prepared.

In this case, the memory control apparatus 5 (shifting to the "pre-reading address generation S3" state) detects this stage as that to read the interrupt vector number VN from the interrupt controller 3 by the address bus 6 and control signal (read signal or the like) outputted from the CPU 2 and generates the pre-reading address PA for referring to the interrupt address table.

Next, in the EXE stage of the (n+2)-th instruction process cycle (time t7), the arithmetic operations of addresses for making reference to the interrupt address table are performed based on the interrupt vector number VN transferred from the MA stage of the n-th instruction process cycle and the head address information of the predetermined interrupt address table.

In this case, the memory control apparatus 5 (shifting to the "pre-reading address supply S4" state) sets the address selection signal X to supply the pre-reading address PA generated in the preceding stages to the ROM 4 and also separates the ROM 4 from the data bus 7 by setting the output acknowledgment signal E to the non-active state to turn off the output buffer 11.

Next, in the MA stage of the (n+2)-th instruction process cycle (time t8), data, namely the head address HA of the interrupt process routine corresponding to the accepted interrupt request is read from the ROM 4 in accordance with the address calculated in the EXE stage of the (n+2)-th instruction process cycle and this head address is transferred to the DEC stage of the (n+4)-th instruction process cycle.

In this case, the memory control apparatus 5 (shifting to the "wait S1" state) sets the address selection signal X to supply the address AD on the address bus 6 to the ROM 4 and also sets the output acknowledgment signal E so that the data read from the Rom 4 is outputted to the data bus 7 via the output buffer 11. Accordingly, the head address of the interrupt process routine corresponding to the interrupt request accepted by the CPU 2 is outputted on the data bus 7.

Since data is read from the ROM 4 in the MA stage of the (n+2)-th instruction process cycle, the wait process should inherently be performed in this stage to execute this process for the period 2×T as long as the duration of two clocks. However, as described above, since the pre-reading address PA is supplied to the ROM 4 from the preceding stage (time t7) by the memory control apparatus 5, the access time of 2×T is ensured for the ROM 4.

Next, in the EXE stage of the (n+4)-th instruction process cycle (time t9), the data transferred from the MA stage of the (n+2)-th instruction process cycle and the head address of the interrupt process routine are transferred to the MA stage of the (n+4)-th instruction process cycle.

Next, in the MA stage of the (n+4)-th interrupt process cycle (time t10), the data transferred from the EXE stage of the (n+4)-th interrupt process cycle, namely the head address HA of the interrupt process program is set to a program counter and the process in the IF stage of the (n+7)-th interrupt process cycle is started. Accordingly, the top instruction of the interrupt process program is read from the ROM 4 and the interrupt process routines corresponding to the interrupt requests accepted in this MA and subsequent stages are executed. Since the reading operation from the ROM 4 is naturally executed in the IF stage of the (n+7)-th interrupt process cycle, the wait request is generated from the memory control apparatus 5 (W=1) and the process is executed for the period of 2×T.

As described above in detail, according to the memory control apparatus 5 of the computer system 1 based on the present embodiment, the memory control apparatus 5 detects the stage from which the interrupt vector number VN is read by referring to the address AD on the address bus 6 and the control signal outputted from the CPU 2 (for example, a read signal), generates an address of the ROM 4 to be accessed next from the CPU 2 based on the interrupt vector number outputted on the data bus, and this address is supplied to the ROM 4 as the pre-reading address before the CPU 2 makes access to the ROM 4.

Therefore, the CPU 2 can reduce, for the reading operation of the pre-reading address of the interrupt process routine from the ROM 4, the access time to the ROM 4, more specifically, the time required for activating the interrupt process routine as long as the period wherein the pre-reading address is supplied before the start of access to the ROM 4 for such reading operation.

As a result, the response property of the interrupt process can be improved and the high speed operation in the CPU 2 can also be realized. This effect becomes greater as the computer system 1 comprises increased peripheral circuits and the interrupt requests are generated more frequently from these peripheral circuits. Accordingly, the computer system 1 can provide excellent effects when the system 1 is adapted to a microcomputer for controlling built-in devices.

[Second Embodiment]

Next, the second embodiment will be described.

A computer system 1a of this second embodiment is different only in a part of the structure from the computer system 1 of the first embodiment. Therefore, only the different part will mainly be described.

Figure 4:
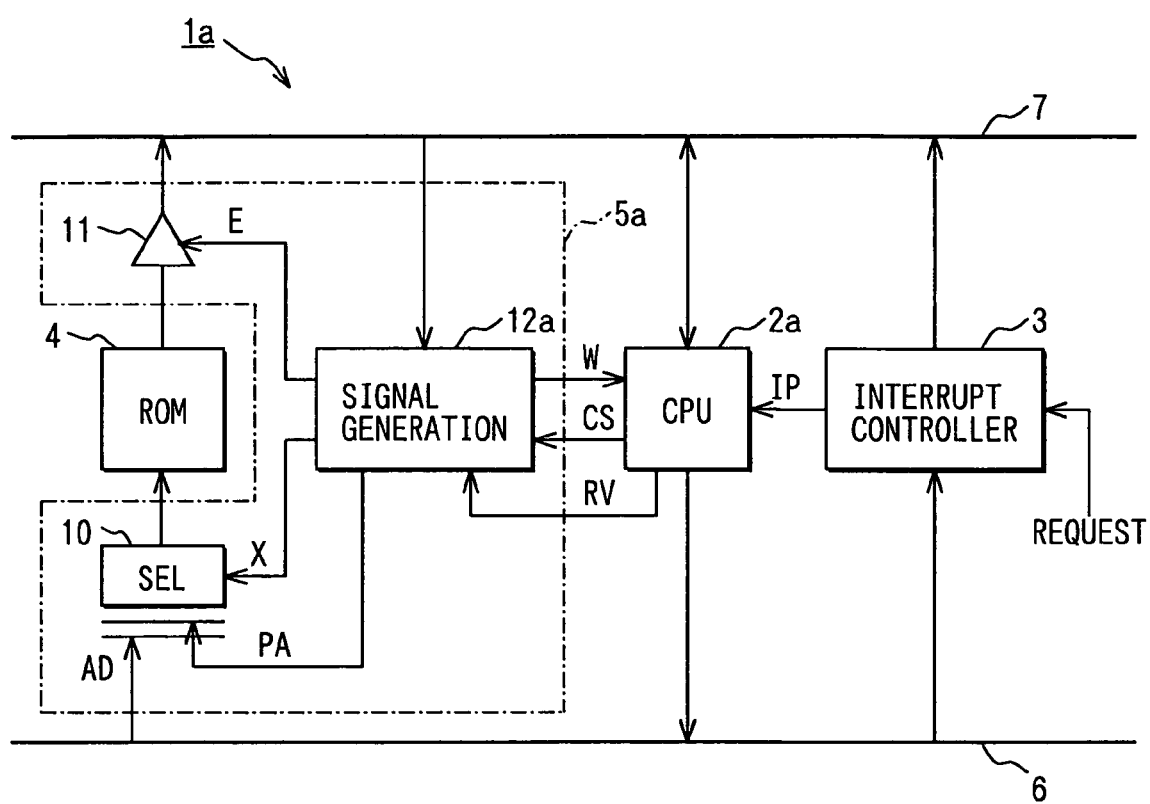
FIG. 4 is a schematic diagram of a computer system including a memory control apparatus according to a second embodiment of the present invention.
Figure 5A:
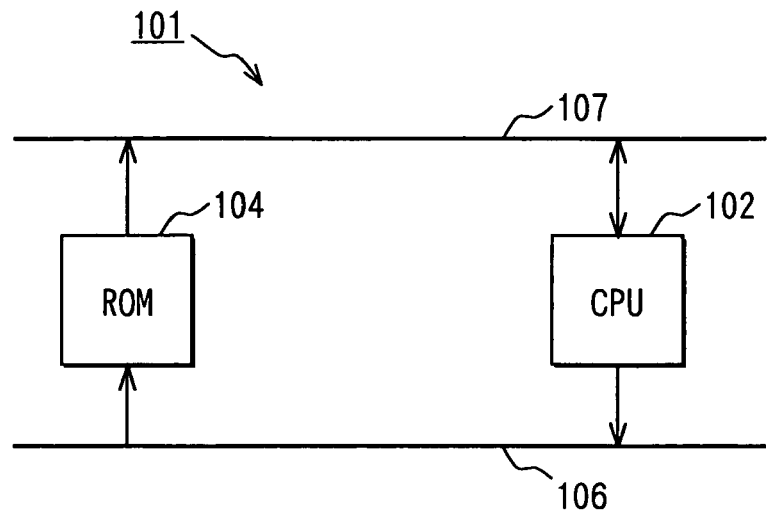
FIG. 5A and FIG. 5B are a schematic diagram and a timing diagram illustrating a structure and operations of a prior art memory control apparatus, respectively.
Figure 5B:
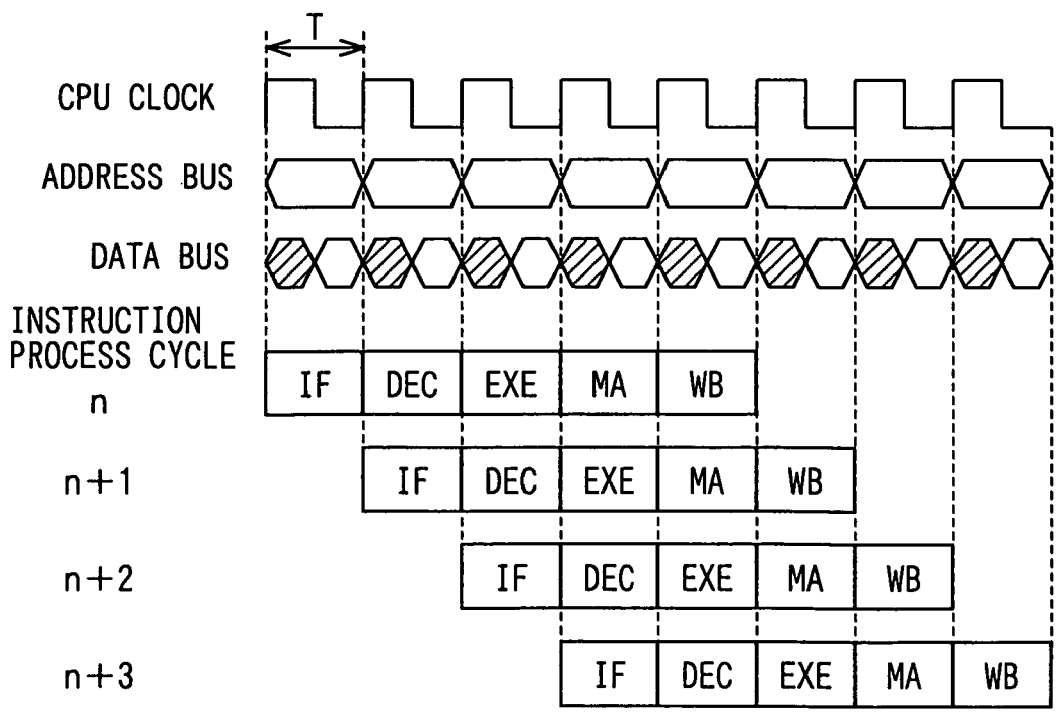
Figure 6A:
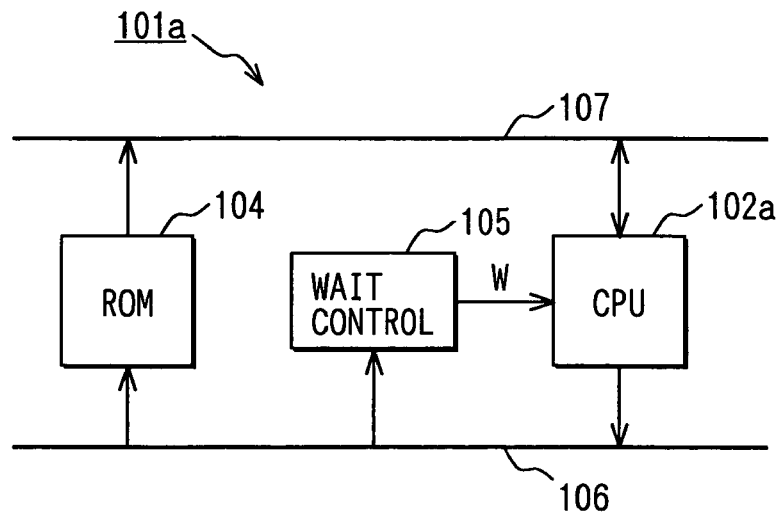
FIG. 6A and FIG. 6B are a schematic diagram and a timing diagram illustrating a structure of the prior art apparatus to execute wait control and operations at the time of branching instruction execution, respectively.
Figure 6B:
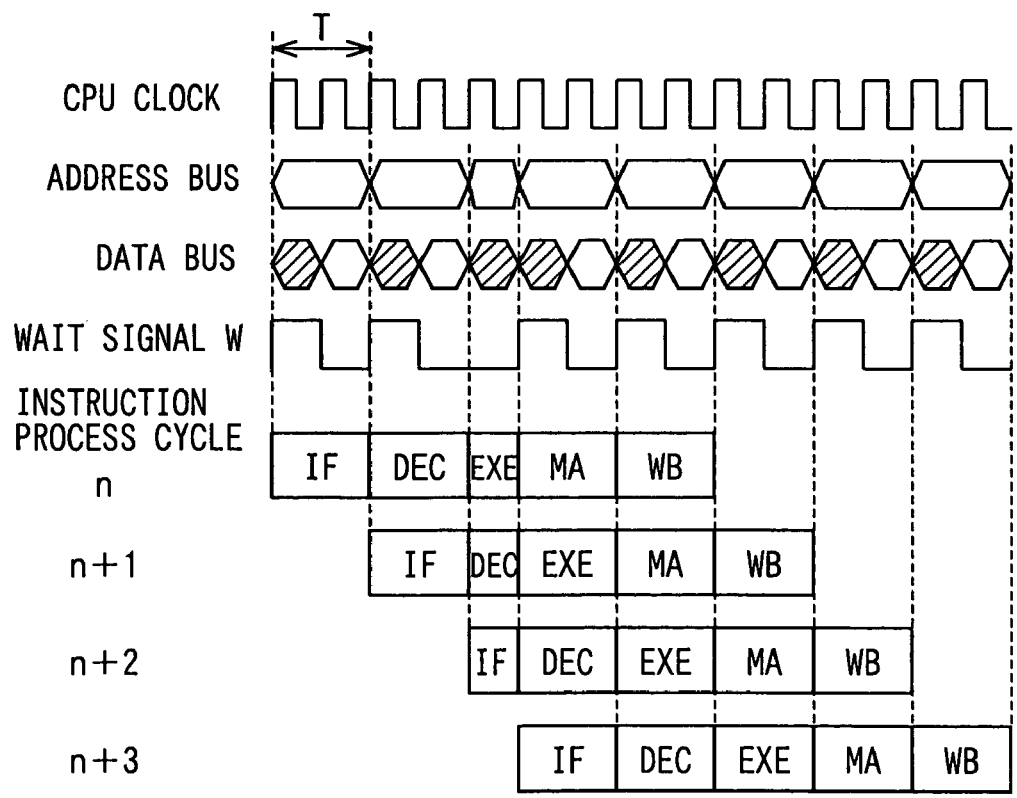
Figure 7:
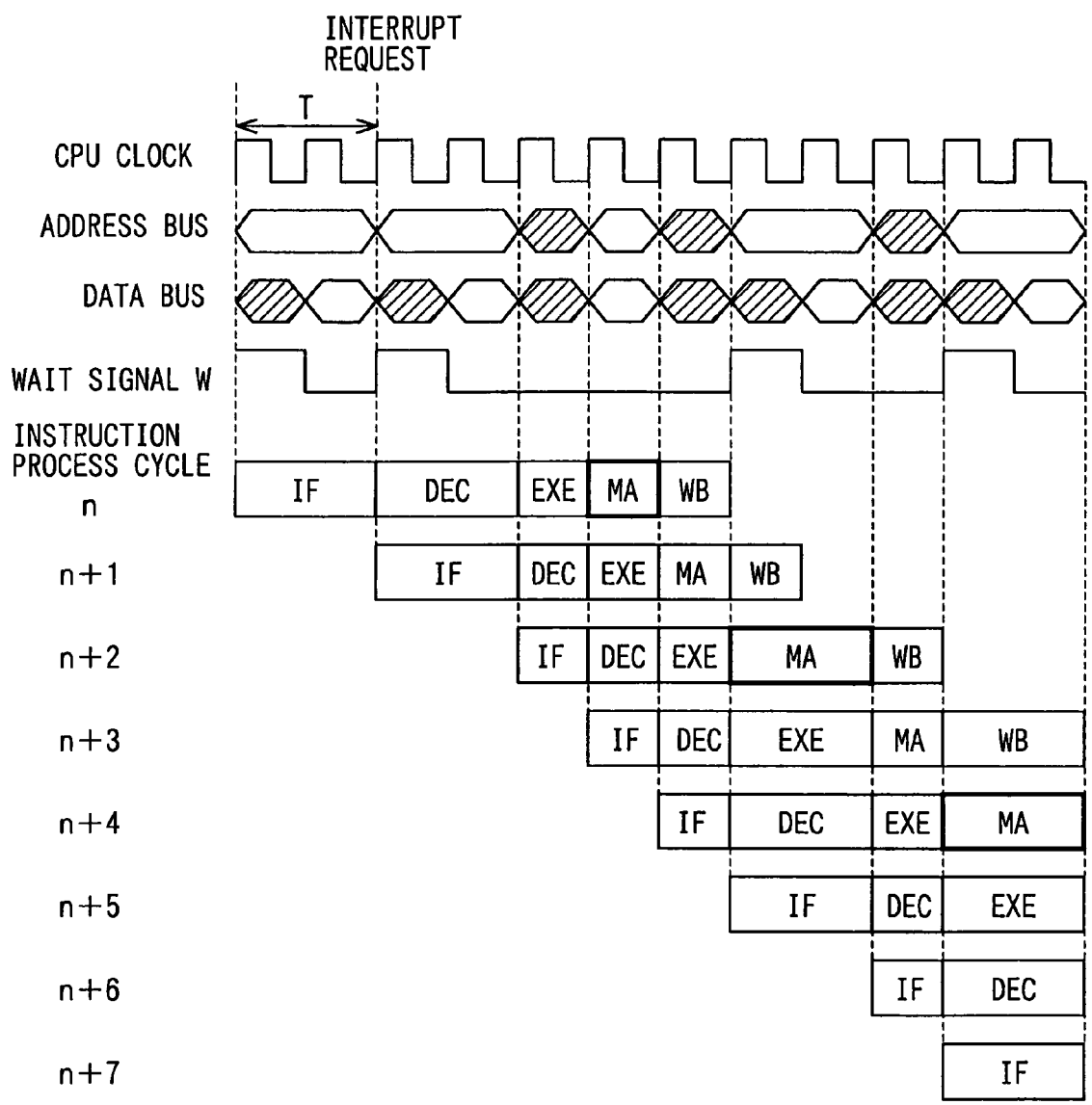
FIG. 7 is a timing diagram illustrating operations of the prior art apparatus to execute wait control when the interrupt process routine is activated.

As illustrated in FIG. 4, in the computer system 1a, a CPU 2a is configured to output, to a signal generator 12a of a memory control apparatus 5a, a stage identification signal RV which becomes active during the period of stage for reading the interrupt vector number from the interrupt controller 3.

In the first embodiment, the signal generator 12 which constitutes the memory control apparatus 5 fetches the data on the data bus 7 to generate the pre-reading address when this data matches with the address on the data bus 6. In this embodiment, however, the signal generator 12a which constitutes the memory control apparatus 5a fetches, when the stage identification signal RV is in the active state, the data on the data bus 7 to generate a pre-reading address.

The memory control apparatus 5a which is configured as described above generates the wait signal W, address selection signal X and output acknowledgment signal E exactly as in the case of the memory control apparatus 5 of the first embodiment.

Accordingly, the computer system 1a of this embodiment can provide the effects which are the same as that of the first embodiment. Moreover, since the address monitor is unnecessary, the signal generator 12a of the memory control apparatus 5a can be simplified as much in the structure.

The preferred embodiments of the present invention have been described above, but the present invention is never limited to such embodiments and also allows various modifications and changes in the profiles thereof.

For example, the length of stage is extended by as long as only one clock with the wait signal W in above embodiments. However, when the access time of the ROM 4 is longer than the times required for the processes in each stage, the length of stage can also be extended by as long as two or more clocks by the wait signal W.

Moreover, the memory control apparatuss 5, 5a are adapted to the ROM in the embodiments described above, but such controllers can also be adapted to the RAM and I/O input or the like.

In addition, the present invention is adapted to the CPU 2, 2a which executes the pipeline process of five stages. However, the present invention can also be adapted to the CPU for the pipeline process of four stages or less, or of six stages or more.

What is claimed is:

1. A memory control method for a computer system including a central processing unit, an interrupt controller and a memory, the central processing unit executing pipeline processing, in which a plurality of instruction processing cycles is executed at timing overlapping partly by dividing a processing function to be executed upon reading an instruction from the memory into a plurality of stages and by executing different stages of the plurality of stages in parallel, the interrupt controller outputting an interrupt signal to the central processing unit in response to an interrupt request applied thereto and setting an interrupt vector number corresponding to the interrupt request in an internal register thereof, and the memory storing at least an interrupt address table, in which are arranged a plurality of programs and an interrupt process routine to be executed by the central processing unit and a head address of the interrupt process routine, the memory having an access time longer than an operation time required for the central processing unit to execute each of the plurality of stages, the memory control method comprising:

identifying an address as an object of a next access to a memory by a central processing unit based on at least any of data, an address and a control signal transferred via a data bus, an address bus and a control line connected to the central processing unit; and supplying a pre-reading address, which is an identified address, to the memory in place of the address supplied via the address bus during a period until at least the central processing unit starts accessing the memory.

2. The memory control method according to claim 1, further comprising the step of:

disconnecting the memory from the data bus during the period until the accessing to the memory by the central processing unit is started after a start of supply of the pre-reading address.

3. The memory control method according to claim 1, further comprising the step of:

fetching data from the data bus when the address on the address bus matches with a preset comparison value, and identifying the pre-reading address based on the fetched data.

4. The memory control method according to claim 3, wherein:

position identifying information which is required to identify the address in the memory to which the data to be fetched by the central processing unit is stored is defined as the fetched data; and the address with which the central processing unit makes access to obtain the position identifying information is defined as the comparison value.

5. The memory control method according to claim 1, further comprising the step of:

fetching data from the data bus when a data fetching instruction is received from the central processing unit; and identifying the pre-reading address based on the fetched data.

6. The memory control method according to claim 5, wherein:

the position identifying information which is required to identify the address in the memory to which the data to be fetched by the central processing unit is stored is defined as the fetched data; and a state signal outputted from the central processing unit when the central processing unit fetches the position identifying information is defined as the data fetching instruction.

7. The memory control method according to claim 5, further comprising the step of:
storing in the memory at least an interrupt address table which is formed by arranging the head addresses of the interrupt process routines,
wherein the position identifying information is the offset information which indicates the position in the interrupt address table to which the head addresses of the interrupt process routines to be activated by the central processing unit.

8. A memory control apparatus for a computer system including a central processing unit, an interrupt controller and a memory,
the central processing unit executing a pipeline processing, in which a plurality of instruction processing cycles is executed at timing overlapping partly by dividing a processing function to be executed upon reading an instruction from the memory into a plurality of stages and by executing different stages of the plurality of stages in parallel,
the interrupt controller outputting an interrupt signal to the central processing unit in response to an interrupt request applied thereto and setting an interrupt vector number corresponding to the interrupt request in an internal register thereof, and
the memory storing at least an interrupt address table, in which are arranged a plurality of programs and an interrupt process routine to be executed by the central processing unit and a head address of the interrupt process routine, the memory having an access time longer than an operation time required for the central processing unit to execute each of the plurality of stages,
the memory control apparatus comprising:
a selecting means for selecting at least one of an address and a pre-reading address supplied via an address bus in response to an address selection signal, and supplying a selected one to the memory;
a signal generating means for generating a wait signal for the central processing unit, an address selection signal for the selecting means and an output acknowledgment signal based on an access request signal outputted from the central processing unit, the address supplied via an address bus and data supplied via a data bus, respectively; and
an output buffer as a bus separating means for outputting the data read out from the memory to the data bus when the output acknowledgment signal is active.

9. The memory control apparatus according to claim 8, wherein the bus separating means separates the memory from the data bus after the selecting means selects the pre-reading address until the central processing unit starts access to the memory.

10. The memory control apparatus according to claim 8, wherein the signal generating means includes:
an address monitoring means for comparing an address on the address bus with a comparison value, which is an address accessed when the interrupt vector number is read out from the internal register of the interrupt controller;
a pre-reading address generating means as an address generating means for generating, when the address on the address bus agrees with the comparison value, the pre-reading address by reading in the interrupt vector number as the data on the data bus and adding the interrupt vector number to a predetermined head address of the interrupt address table; and a timing control means as a selection control means for controlling output timings of the wait signal, the address selection signal and the output acknowledge signal.

11. The memory control apparatus according to claim 10, wherein:
the timing control means proceeds to a wait request state in response to an operating clock of the central processing unit, by making the wait signal to be active when the central processing unit issues an access request and making the output acknowledgement signal to be active from inactive, so that the data read out from the memory is output to the data bus; and
the timing control means has
a wait state for making the output acknowledge signal to be inactive from active when the central processing unit does not issue the access request, for maintaining the same state when the address on the address bus and the comparison value do not agree, and for proceeding to a pre-reading address generating state when the address bus and the comparison value agree,
a wait request state for causing the pre-reading address generating means to make the wait signal to be active when a period of one clock passes and proceeding to the wait state,
the pre-reading address generating state for causing the pre-reading address generating means to generating the pre-reading address, and for setting an address selection signal so that the selector selects the pre-reading address after the period of one clock passes, thus proceeding to a pre-reading address supply state, and
the pre-reading address supply state for maintaining the pre-reading address supply state when the central processing unit does not issue the access request, for setting the address selection signal so that the address on the address bus is selected and supplied to the memory when the central processing unit issues the access request, and making the output acknowledge signal to be active so that the data read out from the memory is output to the data bus, thus proceeding to the wait state.

12. The memory control apparatus according to claim 10, wherein the address generating means reads in the data from the data bus in response to a data read instruction from the central processing unit, and generates the pre-reading address based on the data read in from the data bus.

13. The memory control apparatus according to claim 10 further comprising:
a wait signal generating means for generating a wait signal for the central processing unit; and
an operation switching means for causing, in response to a state signal indicative of an execution condition of access of the central processing unit to the memory, the wait signal generating means and the address generating means to operate when the central processing unit accesses and does not access the memory, respectively, the operation switching means further prohibiting the wait signal generating means to operate when the central processing unit accesses the memory after the selecting means selects the pre-reading address.

* * * * *